United States Patent [19]

Boehmke et al.

[11] 4,110,119

[45] Aug. 29, 1978

[54] RELEASE AGENTS

[75] Inventors: Günther Boehmke, Leverkusen; Hermann Fries, Bergisch-Gladbach; Erich Esch, Leverkusen, all of Germany

[73] Assignee: Bayer Aktiengesellschaft, Leverkusen, Germany

[21] Appl. No.: 742,201

[22] Filed: Nov. 16, 1976

[30] Foreign Application Priority Data

Nov. 21, 1975 [DE] Fed. Rep. of Germany ....... 2552283

[51] Int. Cl.$^2$ .............................................. B28B 7/38
[52] U.S. Cl. ............................. 106/38.24; 106/38.22; 264/213; 264/338; 427/135
[58] Field of Search ............ 106/38.22, 38.24, 249; 260/401, 513 N; 264/213, 338; 427/133, 135; 428/470

[56] References Cited

U.S. PATENT DOCUMENTS

| | | | |
|---|---|---|---|
| 2,356,814 | 8/1944 | Brimmerman et al. | 428/470 |
| 3,413,390 | 11/1968 | Heiss | 264/338 |
| 3,419,405 | 12/1968 | Lang | 106/213 |
| 3,474,166 | 10/1969 | Babcock | 106/38.22 |
| 3,872,038 | 3/1975 | Adams et al. | 106/38.22 |

FOREIGN PATENT DOCUMENTS 204,686 11/1956 Australia ........................ 260/401

*Primary Examiner*—Lorenzo B. Hayes
*Attorney, Agent, or Firm*—Connolly and Hutz

[57] ABSTRACT

N-acyl taurides can be used as release agents for reducing the adhesion of mouldings of a rubber or plastics material to the surface of a mould and for preventing sheet-form compounds from sticking together.

7 Claims, No Drawings

RELEASE AGENTS

The production of articles from rubber compounds and plastics requires release agents which are intended to prevent rough sheets of the compounds from sticking together during storage. In addition, elastomer compounds and thermoplastics are frequently compression-moulded or injection-moulded in moulds for final shaping. Whereas, in the case of plastics, the stable final shape is formed by cooling the moulding removed from the mould, it is obtained in the case of rubber articles by a crosslinking reaction which takes place in the mould under the effect of heat. In the following mould-release operation, difficulties often arise as a result of the adhesion of the cured article to the metal moulds normally used. Compound residues, migrant constituents of the compounds or decomposition products remain adhering to the surfaces of the moulds, which results in heavy contamination in cases where the moulds are repeatedly used. The adhesion of cured articles to the walls of the mould can on the one hand result in damage to the completed cured article. On the other hand, the heavy contamination of the mould necessitates frequent cleaning under the effect of which the surface of the mould gradually deteriorates.

The release agents used on a commercial scale for sheet-form compounds are powders, such as talcum or zinc stearate, the use of which is attended by the disadvantage of dust pollution. Mould surfaces can be treated, for example, by chrome-plating or teflonising. Expensive techniques such as these are reflected in the high price of the moulds. In addition, it is standard practice to spray the surfaces of the mould with a release agent. Conventional release agents of this kind are organic substances or silicone-based products. The disadvantage of most of the organic release agents normally used for vulcanisation moulds is their thermal instability at the high vulcanisation temperatures of more than 200° C. now commonly applied. This results in loss of the release effect and in increased mould contamination due to thermal decomposition. Although silicone-based release agents are extremely heat-stable and have a good release effect, even at high vulcanisation temperatures, they are co-crosslinked in the peroxidic crosslinking of polymers and are not suitable for the use as release agents in this case.

In addition, they leave behind on the surface of the cured article a film which prevents the cured articles from being lacquered and bonded or which even adversely affects the migration of antioxidants and paraffins to the surface and their formation of films thereon, thereby promoting surface ageing.

Apart from their physical effectiveness, the release agents also have to satisfy chemical and heat stability requirements. On account of the hydrolytic dissociation and the liberation of fatty acids, the fatty acid salts often used involve a risk of corrosion in the case of metal moulds. Although other auxiliaries such as the fatty acid esters of isethionic acid, show extremely good release properties, they are unstable at temperatures above 160° C. Through decomposition of the fatty acid at temperatures above 160° C., they also have a corrosive effect which is soon reflected in the roughening of the metal surface and in adhesion of the cured articles.

The present invention relates to new release agents for reducing the adhesion of cured articles of rubber compounds and plastics which in practical application obviate the disadvantages referred to above. The new release agents are distinguished by the fact that they contain N-acyl taurides known per se corresponding to the general formula:

$$R-CO-NH-CH_2-CH_2-SO_3M \qquad (I)$$

in which R represents a $C_7-C_{21}$-alkyl or alkenyl radical which may be substituted by one or two hydroxy groups, and M represents an alkali or the equivalent of an alkaline earth metal cation, ammonium, or mono-, di- or tri-alkanol ammonium.

The taurides of natural fatty acid mixtures may also be used to good effect in the release agents according to the invention.

By virtue of their ready accessibility, the sodium salts of taurides of fatty acids or fatty acids mixtures are of particular interest. Particularly good results are obtained with release agents of the type containing the sodium tauride of stearic acid.

The acyl taurides may be produced by any one of a number of well known processes such as those described, for example, in DT-PS No. 655,999 and DT-PS No. 1,010,799. Alternatively, they may be produced by the Schotten-Baumann method. It is advisable to free the taurides produced by the industrial processes mentioned above, before they are introduced into the mould release agents, from the salts of inorganic acids introduced or formed during production or from free fatty acids which may still be present in them as impurities as a result of incomplete reactions or secondary reactions, by conventional purification techniques. Impurities of this type could counteract the basically outstanding anti-corrosive effect of the taurides in the mould release agents. By contrast, other secondary products, such as amides for example, are generally harmless.

In directly useable form, the taurides may also be produced by a new process which is particularly advantageous in terms of ecology and which is described in the following:

It has been found that acyl taurides corresponding to the formula:

$$R-CO-NH-CH-_2-CH_2-SO_3M \qquad (I)$$

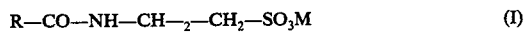

in which

R: represents a $C_7-C_{21}$-alkyl or alkenyl radical which may be substituted by one or two hydroxy groups, and M: represents an alkali or alkaline earth metal cation, ammonium or mono-, di- or tri-alkanol ammonium, can be obtained in high yields by reacting corresponding fatty acids or mixtures thereof, urea and alkali or alkaline earth hydroxy ethane sulphonates and optionally converting the product of this reaction into the ammonium, mono-, di- or tri-alkanolamine salts. Preferred alkanolamines are ethanolamines or propanolamines.

The reactants are used in a substantially molar ratio preferably in a ratio of fatty acid to urea to hydroxyethane sulphonate of 1:1–2:0.8–1.3.

The preferred reaction temperatures are in the range of from 130° to 250° C. and more especially in the range of from 140° to 210° C.

The reaction may also be carried out at temperatures in the range of from 250° to 280° C. However, since a considerable quantity of hydroxyethane sulphonate is still present at the outset, it is best not quite to reach its decomposition temperature of from about 210° to 220° C. in order to avoid heavy black-brown discoloration.

The reaction times are in the range of from 4 to 13 hours. In one preferred embodiment, the three reactants are initially heated to 180° C., after which the temperature is increased over a period of 1 to 3 hours to 205° – 210° C. The progress of the reaction may be followed from the increasing solubility in water, from the acid number and by thin-layer chromatography.

In one particularly preferred embodiment, the fatty acid and urea are stirred at 130° to 140° C. until dissolution has occurred. The hydroxy ethane sulphonate is introduced into this homogeneous melt. After the substantially non-lipophilic salt has been dissolved in the organic phase, the reaction is completed by heating to 180° – 240° C. and preferably to 210° C. The fatty acids used may be saturated, unsaturated or substituted by OH-groups. Suitable pure acids are, for example, lauric acid, myristic acid, palmitic acid, stearic acid, arachic acid, oleic acid, elaidic acid, ricinoleic acid, erucic acid, hydroxy stearic acid, dihydroxy stearic acid or abietic acid. However, it is preferred to use fatty acid mixtures such as those which occur in natural fats, for example coconut oil, palm oil, palm kernal oil, tallow oil, soya oil, sunflower oil, rapeseed oil, train oil or thistle oil acid.

Towards the end of the reaction it is advantageous, especially where unsaturated fatty acids are used, to add products which prevent the reaction products from discolouring by known mechanisms, for example from 0.1 to 0.5% by weight of dimethyl phosphite.

In order to prevent discoloration through oxidation, it is advantageous to carry out the reaction in an inert gas, for which purpose the $CO_2$ emanating from the reaction may be used. However, nitrogen for example may also be used.

To produce the sodium salt of stearic acid tauride used in the release agents according to the invention by this process, it is possible for example to melt 270 g of commercial grade stearic acid (acid number 205) and 66 g of urea and to stir the resulting melt at 130° to 140° C. until the urea has dissolved. Following the introduction of 153 g of hydroxy ethane sulphonate, the temperature is increased to 210° C. and left at that level for 4 hours. After cooling, the melt is poured out and finely ground in the usual way. The reaction product may optionally be used in liquid form as a mould release agent.

One method of forming the acyl taurides has proved to be particularly advantageous for their use in release agents. In this method, the products obtainable by one of the processes described above, preferably the last of the processes described above, is dissolved, optionally after purification, in three times the quantity of water heated preferably to 70° – 80° C., and the resulting solution is cooled over a period of a few minutes to a temperature of 30° C. or lower. On a commercial scale, cooling may be obtained, for example, by passing the solution through a cooler or by adding ice. The products are obtained in the form of fine white crystal needles which are visible under a microscope with 100- to 400-fold magnification.

If, by contrast, the mixture is left to cool over a period of 1 to 2 hours and if the heat of crystallisation is not dissipated, the substance crystallises in the form of flat flakes of large surface area. Much larger quantities of these flakes are required to obtain the same release effect, presumably because of the poor interfacial coverage.

The release agents according to the invention may be used in the form of technically pure taurides or, for convenient handling, in concentrated form, preferably as pastes, solid preparations, solutions or emulsions, optionally in admixture with other property-improving constituents, such as emulsifiers, anticorrosive agents or viscosity-increasing agents, and are optionally diluted before use. Mixtures with other release agents, for example those based on soaps, silicone oils, fluorohydrocarbons and powdering agents, are also suitable. Preparations with inert propellent gases or additional organic solvents are suitable for application through atomisers.

Preparations, preferably emulsions, containing from 0.01 to 10% by weight and preferably from 0.1 to 0.5% by weight of N-acryl taurides are used. Preferred diluents are water and/or organic solvents, such as commercial-grade alcohols or petrol, providing the temperatures at which the release agents are applied allow the use of such solvents.

In order to obtain a good release effect in the case of sheet-form compounds, the sheets are best coated or sprayed with the release agent emulsion or dipped into a solution of the release agent. Since a thin film of the release agent is applied to the moulds by spraying them with an aqueous solution or a suspension in the case of substantially insoluble compounds, it is essential that the other constituents of the preparations should be physiologically acceptable. They should neither be toxic nor should they cause any irritation of the skin. The N-acyl taurides used satisfy these requirements to a high degree.

The products according to the invention are release agents with an outstanding release effect and high thermal stability which obviate the disadvantages referred to above. They may be used for the spray-coating and brush-coating of moulds of the kind used for moulding elastomer mixtures and plastics such as, for example, polyurethanes, polycarbonates, PVC, polyamides, etc. They are stable at vulcanisation temperatures of more than 200° C., do not give rise to any welding difficulties, reduce mould contamination, enable the surface of the cured articles to be lacquered and bonded and may be used for all forms of crosslinking. In the elastomer processing field, tests have revealed an excellent release effect in the case of compounds based on NBR, CR, NR, SBR, BR, IR, IIR, SiR, CSM, CHR, EPDM, ACR etc. (cf. IUPAC-nomenclature) which are mentioned purely by way of example.

The invention is illustrated by but by no means limited to the following Examples. The percentages are by weight unless otherwise indicated.

EXAMPLES

The production of selected N-acyl taurides by a new process is described in Examples 1 to 4.

EXAMPLE 1

260 g of coconut oil fatty acid (acid number 260) are melted with 70 g of urea and 155 g of sodium hydroxy ethane sulphonate. The melt is then heated with stirring to 180° C. while $CO_2$ gas is passed over. The temperature is then increased over a period of 1 hour to 210° – 215° C. and kept at that level for about 4 hours. A relatively wide opening must be left for the gas given off because the ammonium carbonate begins to sublime on the colder parts of the apparatus. After approximately 2 hours, no more free fatty acid can be detected. After 4 hours, a product which still contains fractions of fatty acid amide is obtained and may be used as a mould release agent in the form of an aqueous emulsion.

EXAMPLE 2

226 g of myristic acid and 68 g of urea are heated to 135° – 140° C. When the fatty acid has melted, the melt is stirred until the urea has dissolved in the acid. 155 g of potassium hydroxy ethane sulphonate are then added, nitrogen is introduced into the reaction vessel and the temperature is increased to 210° C. After 8 hours, a readily water-soluble product which does not have an acid number (from free fatty acid) is obtained. The yield amounts to approximately 380 g of myristic acid tauride.

EXAMPLE 3

270 g of commercial-grade stearic acid (acid number 205) and 66 g of urea are melted and the resulting melt is stirred at 130° to 140° C. until the urea has dissolved. 153 g of sodium hydroxy ethane sulphonate are then introduced and the temperature is increased to 205° – 210° C. This temperature is maintained for approximately 12 hours. The melt is then cooled to between 130° and 140° C. and poured out. The product can be finely ground in the usual way.

EXAMPLE 4

The same quantities as in Example 3 are reacted by the same process except that the reaction is terminated after 4 hours at 210° C. The reaction mixture obtained can be dissolved in water to form a 0.5% emulsion and may be used in this form as a release agent. With regard to the release effect of the N-stearyl tauride salt, however, it is particularly favourable to dissolve the cooled reaction product in approximately three times the quantity of water, preferably heated to 70° – 80° C, and to cool the solution over a period of a few minutes to a temperature of 30° C. or lower either by immersing it in an ice bath or by adding ice. The tauride salt precipitates in the form of fine white crystal needles which are visible under a microscope with 100 – 400 fold magnification. The crystalline product is used as a mould release agent in the form of a 0.5% aqueous suspension.

Examples 5 to 10 demonstrate the effectiveness of the release agents according to the invention in the mouldrelease of selected rubber and plastics compounds by comparison with known products.

EXAMPLE 5

An elastomer compound of the following recipe:

Palw crepe: 100.0 parts by weight
Blanc fix: 150.0 parts by weight
Titanium dioxide: 7.0 parts by weight
Ozone protective wax: 0.5 part by weight
Antioxidant based on 2,6-di-tert.butyl-p-cresol: 1.0 part by weight
Zinkoxide active ®: 0.8 part by weight
Zinc diethyldithiocarbamate: 0.3 part by weight
Thiuram: 0.08 part by weight
Mercaptobenzthiazole: 0.04 part by weight
Sulphur: 2.2 parts by weight is cured in duraluminium moulds into a complicated undercut closure stopper and vulcanized for 8 minutes at 143° C. Before they are filled, the hot moulds are sprayed with release agent emulsions A, B and C. Each emulsion contains 0.5% of the active substance and has been formed by diluting substances A, B and C. In this Example and the following Examples, Substance A is the sodium salt of stearic acid tauride, Substance B is a standard commercial-grade release agent based on the alkali metal salt of a fatty acid derivative, and Substance C is a standard commercial-grade release agent of a silicone oil emulsion and the alkali metal salt of a fatty acid derivative (like Substance B).

After 450 moulding cycles, the moulds treated with A do not show any surface changes and the cured articles can readily be released from the hot mould.

The above compound could not be moulded in the moulds treated with B because the release effect was inadequate.

After only about 100 moulding cycles, the moulds treated with C show a slight coating which, after 450 moulding cycles, had grown into a thin brown layer. Although the release effect was still in evidence, the dimensional accuracy of the mouldings and the extremely rough surface made it necessary to clean the moulds.

EXAMPLE 6

A rubber compound of the following recipe:

Smoked sheets: 85.0 parts by weight
Reclaim (50% rubber): 25.0 parts by weight
Ebonite dust: 25.0 parts by weight
Whiting: 35.0 parts by weight
Quartz powder: 20.0 parts by weight
Mineral rubber: 2.0 parts by weight
Mercaptobenzthiazole: 1.5 parts by weight
Sulphur: 37.5 parts by weight is cured in steel moulds over a period of 25 minutes at 140° C to form coarse wedges. Before filling, the moulds were sprayed with a 0.5% release agent emulsion. The high sulphur content of the mixture causes it to migrate to the surface of the raw compound which during moulding results in the formation of faults and in contamination of the moulds.

A has an excellent release effect, leaves the cured articles with a completely smooth surface, avoids shrinkage marks and enables moulding to be carried out without venting. Even after 100 moulding cycles, there was no sign of any contamination of the mould surfaces. The sulphur exudated flowed out of the moulds during moulding.

Although B does have a release effect, it results in the formation of mouldings with a rough surface and necessitates frequent venting during the moulding operation. As a result of contamination of the mould surface, the mould had to be cleaned after 50 vulcanisations.

C shows the same behaviour as substance B.

EXAMPLE 7

The following mixtures based on NBR (I) and CR (II) used for rubber-fabric bonding and for rubber-steel cord bonding:

(I)

Acrylonitrile-butadiene rubber: 100.0 parts by weight
Active precipitated silica: 30.0 parts by weight
Carbon black: 25.0 parts by weight
Zinkoxyd aktiv ®: 5.0 parts by weight
Bonding agent of resorcinol and stearic acid: 3.4 parts by weight Stearic acid: 1.3 parts by weight
Antioxidant based on phenyl-α-naphthylamine: 8.0 part by weight
Antioxidant based on N-isopropyl-N′-phenyl-p-phenylene diamine: 0.8 part by weight
Plasticizer (aromatic polyether): 10.0 parts by weight
Coumarone resin: 2.5 parts by weight
Benzothiazyl-2-cyclohexyl sulphenamide: 1.75 parts by weight
Sulphur: 1.8 parts by weight
Formaldehyde donor as bonding additive: 2.3 parts by weight (II)

Chloroprene rubber: 100.0 parts by weight
Active precipitated silica: 30.0 parts by weight
Magnesium oxide: 4.0 parts by weight
Zinc oxide: 5.0 parts by weight
Bonding agent of resorcinol and stearic acid: 3.4 parts by weight
Stearic acid: 0.3 part by weight
Antioxidant based on phenylnaphthylamine 2.0 parts by weight
Plasticizer based on methylene-bis-thioglycolic acid butyl ester: 5.0 parts by weight
Di-o-tolyl guanidine accelerator: 1.0 part by weight
Thiuram accelerator: 1.0 part by weight
Sulphur: 0.5 part by weight
Formaldehyde donor as bonding additive: 2.3 parts by weight were vulcanised with the materials to be bonded in steel moulds to form sheets over periods of 30 minutes and 45 minutes, respectively, at a temperature of 150° C. Before filling, the moulds were sprayed with a 0.5% release agent emulsion.

A resulted in satisfactory, ready mould release of the vulcanisates and, even after several moulding cycles, did not produce any contamination of the mould.

In the case of B and C, the moulds could not be opened and emptied. The moulds had to be torn apart from one another with considerable force, as a result of which the cured acrticles were inevitable damaged.

EXAMPLE 8

Rubber boots were vulcanized for 12 minutes at 165° – 175° C in a boot press. The boot moulds were each sprayed with a 0.5% release agent emulsion before the shank was introduced. After vulcanisation, the boots were coated with a polyurethane lacquer. The following mixture was used for the outer cover:
  Smoked sheets: 50.0 parts by weight
  NBR: 50.0 parts by weight
  Reclaim: 60.0 parts by weight
  Whiting: 80.0 parts by weight
  Carbon black: 8.0 parts by weight
  Stearic acid: 0.7 part by weight
  ozone protective wax: 1.5 parts by weight
  Antioxidant based on N-isopropyl-N-phenyl-p-phenylene diamine: 0.8 part by weight
  Zinkoxyd aktiv ®: 12.0 parts by weight
  Benzothiazyl-2-cyclohexyl sulphamide accelerator: 1.2 parts by weight
  2-mercaptobenzothiazole accelerator: 0.3 part by weight
  Sulphur: 3.6 parts by weight Use of the Release Agent Only substance A allowed ready mould release and, even after 300 moulding cycles, did not produce any contamination of the mould. The boots could be lacquered without pretreatment.

EXAMPLE 9

A silicone rubber compound crosslinked by peroxides in 15 minutes at 158° C is moulded into sheets which are intended to have a smooth surface. Before filling, the moulds were each sprayed with a 0.5% release agent emulsion.

The use of A gave sheets which had a smooth surface and could readily be released from the mould. Even after 50 moulding cycles, the mould showed no signs of contamination.

Although B had a certain release effect, a light brownish cotaing was formed on the surface of the mould after a few moulding cycles.

C was ineffectual as a silicone-based release agent in the peroxidic crosslinking stage.

EXAMPLE 10

A granulate of styrene-butadiene-styrene block polymer is moulded at 150° C to form squares measuring 100 mm × 100 mm × 1.5 mm. Before filling, the moulds were sprayed with a 0.5% release agent emulsion.

A enables the plastics article to be readily release from the mould. The article has a smooth surface.

B and C have a poor release effect. In addition, they promote the formation of flow marks which make the surface of the squares irregular.

We claim:

1. A process for reducing the adhesion of molded articles of rubber compounds and plastics to the mold surfaces and for preventing sheet-form mixtures from sticking together which comprises applying to a mold surface a release agent consisting essentially of a compound having the formula

R—CO—NH—CH$_2$—CH$_2$—SO$_3$M wherein R is alkyl or alkenyl of 7 to 21 carbon atoms and having up to two hydroxyl groups, and M is a member selected from the group consisting of alkali metal cation, alklaline earth metal cation, ammonium, mono-alkanolammonium, di-alkanolammonium, and tri-alkanolammonium, each said alkanol moiety being ethanol or propanol.

2. The process of claim 1 wherein M is sodium.

3. The process of claim 1 wherein M is sodium and R is a stearyl group.

4. The process of claim 1 wherein the release agent is free from water-soluble salts of inorganic acids.

5. The process of claim 1 wherein the release agent is dispersed in an organic solvent.

6. The process of claim 1 wherein the release agent is dispersed in water.

7. The process of claim 1 wherein the release agent is applied to a mold surface by spraying.

* * * * *